United States Patent [19]

Kato

[11] Patent Number: 5,504,381
[45] Date of Patent: Apr. 2, 1996

[54] VIBRATION CONTROL DEVICE FOR ROTATING MACHINE

[75] Inventor: Kazumichi Kato, Ise, Japan

[73] Assignee: Shinko Electric Co., Ltd., Tokyo, Japan

[21] Appl. No.: 201,885

[22] Filed: Feb. 24, 1994

[30] Foreign Application Priority Data

Feb. 24, 1993 [JP] Japan .................................... 5-035861
Mar. 5, 1993 [JP] Japan .................................... 5-045556

[51] Int. Cl.$^6$ .................................................... H02K 7/08
[52] U.S. Cl. ............................................ 310/51; 310/90
[58] Field of Search .............................. 310/51, 90.5, 90

[56] References Cited

U.S. PATENT DOCUMENTS

| | | | |
|---|---|---|---|
| 5,235,227 | 8/1993 | Fazekas | 310/51 |
| 5,455,472 | 10/1995 | Weiss et al. | 310/90.5 |

FOREIGN PATENT DOCUMENTS

| | | |
|---|---|---|
| 0151857 | 8/1985 | European Pat. Off. . |
| 0234728A2 | 9/1987 | European Pat. Off. . |
| 0332979A2 | 9/1989 | European Pat. Off. . |
| 0508019A1 | 10/1992 | European Pat. Off. . |
| 0526903A1 | 2/1993 | European Pat. Off. . |
| 0560234A2 | 9/1993 | European Pat. Off. . |
| 58-108466 | 1/1985 | Japan . |

OTHER PUBLICATIONS

European Search Report, European Patent Office Dated Jun. 23, 1994.
Siegwart, R. and Traxler, A., *Proceedings of the 25th Intersociety Energy Convension Engineering Conference* 3:494–9, 1990.

Primary Examiner—Thomas M. Dougherty
Assistant Examiner—Judson H. Jones
Attorney, Agent, or Firm—Darby & Darby

[57] ABSTRACT

A vibration control device for a rotating machine in which a primary yoke is provided within a hollow space of a secondary yoke so that the secondary yoke rotates about a shaft inserted through the primary yoke. A plurality of electromagnet portions are arranged around a peripheral surface of the primary yoke and there are a pair of sensors and a control portion. The electromagnet portions include at least a pair of first and second electromagnet portions and another pair of third and fourth electromagnet portions. The first and second electromagnet portions so arranged opposite to each other with respect to an X-axis direction, while the third and fourth electromagnet portions are arranged opposite to each other with respect to a Y-axis direction. One sensor detects a positional displacement between the primary and secondary yokes with respect to the X-axis direction, while another sensor detects a positional displacement between the primary and secondary yokes with respect to the Y-axis direction. A positional displacement detected by one sensor is controlled to be reduced by controlling electric current supplied to the first and second electromagnet portions, while a positional displacement detected by another sensor is controlled to be reduced by controlling electric current supplied to the third and fourth electromagnet portions. By electromagnetically controlling the positional displacement between the primary and secondary yokes with respect to each of the axial directions, vibration of the shaft is reduced.

13 Claims, 13 Drawing Sheets

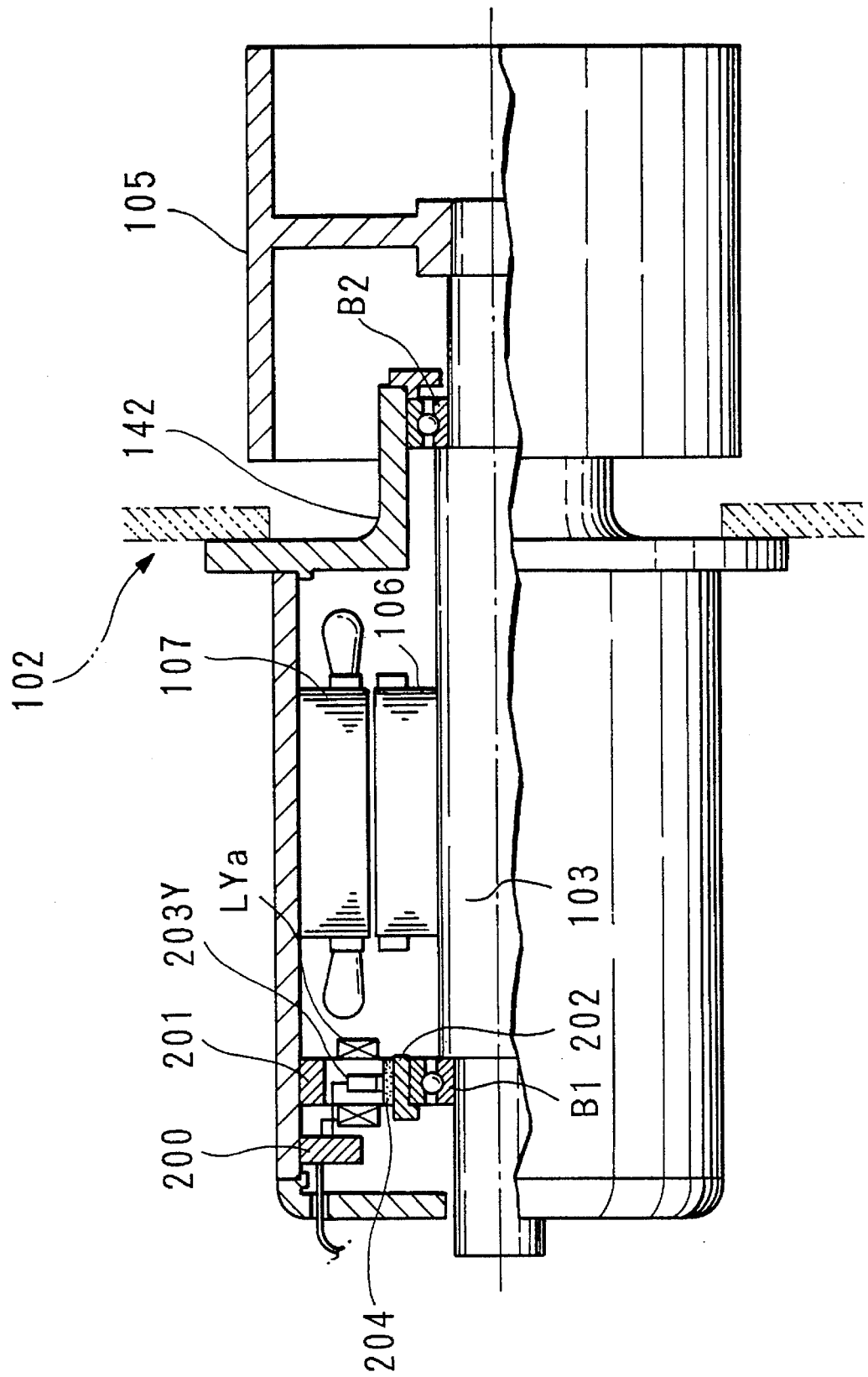

VIBRATION CONTROL DEVICE FOR ROTATING MACHINE

BACKGROUND OF THE INVENTION

1. Field of the Invention

The present invention relates to a vibration control device which is suitable for use in a rotating machine such as a high-speed motor employed in textile machinery and the like.

2. Prior Art

FIG. 1 is a sectional view illustrating a mechanical structure of a high-speed motor which has a general construction of the motor conventionally known and is especially used in textile machine.

The motor shown in FIG. 1 is a so-called outer-rotor motor, in which a roller 2 having a hollow-cylinder-like shape rotates about a shaft 1 whose both sides are securely fixed. The roller 2 cooperates with the shaft 1 by means of bearings 3 at both sides thereof such that the roller 2 can freely rotate about the shaft 1.

A rotor core 5 is attached to an interior surface of the roller 2 through a magnet 4, while a stator core 6 is attached to the shaft 1 to face the rotor core 5 with an air gap therebetween. Upon the receipt of electric currents carried from a cable 7 which is introduced to the stator core 6 through a hollow portion of the shaft 1, a rotating magnetic field is produced around the stator core 6.

In short, the above-mentioned magnet 4, the rotor core 5 and the stator core 6 are assembled together to form a synchronous induction motor. Instead of the synchronous induction motor, it is possible to employ an induction motor. In the synchronous induction motor described above, the roller 2 rotates about the shaft 1. By pressing a hobbin winder against a peripheral face of the roller 2 which is rotating about the shaft 1, yarn is wound up.

Thus, the peripheral velocity of the rotating roller 2 is roughly proportional to the winding speed of the yarn.

It is desired to raise the winding speed of the yarn for an improvement of the productivity in the textile industries. For this reason, a higher peripheral velocity is required for the roller 2. For example, the peripheral velocity of 6,000 [m/min] or so is required for the roller 2. In order to achieve such high peripheral velocity, there are provided two methods as follows:

① a first method to enlarge an outer diameter of the roller 2; and

② a second method to increase the number of revolution of the roller 2.

The first method raises a new problem in that the size of the roller 2 must be enlarged as well as another problem that a higher precision is required for the bearing 3 to respond to an increase of the weight of the roller 2.

Therefore, the second method is conventionally employed. In addition, in this method the diameter of the shaft 1 is reduced as well. Thus, it is possible to use a bearing which has a smaller maximum load and smaller major and minor diameters.

However, as the diameter of the shaft 1 becomes smaller, the frequency of natural vibration occurring on the shaft 1 should become lower. Under the effect of a large number of revolutions of the roller 2, the above-mentioned natural vibration should occur when the roller 2 rotates at a certain number of revolutions which is lower than the number of revolutions corresponding to the peripheral velocity to be required. This may adversely affect the operation of the motor.

Next, the natural vibration will be described in detail. In general, the natural vibration represents a mechanical characteristic which is inherently provided in the mechanical structure. When exciting the mechanical structure with its natural frequency, the resonance phenomenon occurs so that the mechanical structure may vibrate with a very large vibration.

Each of FIGS. 2A, 2B and 2C shows the manner of the natural vibration of the shaft 1 in connection with each of vibration modes. As compared to the shaft 1, the roller 2 has a greater rigidity. Hence, as compared to the shaft 1, the roller 2 has a higher natural frequency. Therefore, when observing the motor as a whole, the natural vibration of the roller 2 can be neglected. Thus, it is possible to study the manner of vibration of the motor by referring to only the natural vibration of the shaft 1.

It can be observed from FIG. 2A that no vibration is produced when the rotation of the roller 2 is stopped. However, when starting the rotation of the roller 2, due to the vibration accompanied with the rotation of the roller 2, the shaft 1 should be excited in vibration. Thereafter, when the number of revolution of the roller 2 reaches 7,980 rpm as shown in FIG. 2B, a certain natural vibration (at a frequency of 133 Hz) is produced on the shaft 1, both of whose securely fixed side edges act like nodes for the vibration. This manner of vibration will be represented by a term called "first-order vibration mode". In the case of the first-order vibration mode, the roller 2 as a whole should be largely vibrated up and down in accordance with the vibration of the shaft 1.

Thereafter, when the number of revolution of the roller 2 is further increased to reach 16,080 rpm as shown in FIG. 2C, a split natural vibration (at a frequency of 268 Hz) is produced on the shaft 1, in which both-side edges of the shaft 1 and a mid-point therebetween act like the nodes for the vibration. This manner of vibration will be represented by a term called "second-order vibration mode". In the case of the second-order vibration mode, due to the vibration of the shaft 1, the roller 2 should be vibrated such that the both-side edges thereof vibrate at different phases which are reverse (in phase opposition) to each other. In short, the roller 2 vibrates like a seesaw.

Similarly, every time the number of revolution of the roller 2 is increased by a certain number of revolutions, the split mode natural vibration is produced on the shaft i by using its both-side edges and other points as the nodes for the vibration. Each of the other points is located for each of equally divided parts which are disposed between both of the side edges of the shaft 1. Herein, the number of the equally divided parts is set as an integral number which is equal to or greater than "1". The manner of such high-order vibration will be represented by a term called "nth order vibration mode". Incidentally, as the integer "n" becomes higher, it becomes increasingly more difficult to neglect the natural vibration of an element other than the shaft 1.

When the natural vibration is produced on the shaft 1 as described above, the roller 2 is correspondingly vibrated. In a textile machine, such vibration is transmitted to the hobbin winder. This results in a lower quality of the yarn to be wound. Due to the natural vibration of the shaft 1, the rotor core 5 may come in contact with the stator core 6 (see FIG. 1), which causes a possibility that the electric motor itself will be damaged.

FIG. 3 is a sectional view illustrating the mechanical construction of a rotating machine 101 equipped with an overhang roller, which is applied to the textile machine used for spinning cotton into thread and the like. FIG. 3 is a view of an inner structure of the rotating machine 101 whose one-side portion from an axial line J is cut out. As shown in FIG. 3, a body of the rotating machine 101 is fixed with an object 102 which is to be driven by the rotating machine 101. A numeral 103 denotes a shaft which works as a rotating axis for the rotating machine 101. This shaft 103 is inserted through the body of the rotating machine 101 and is surrounded by a rotor 106. A stator 107 is further provided inside of the body of the rotating machine 101 such that the stator 107 surrounds a rotor 106. This stator 107 produces a magnetic field to produce rotation of the rotor 106.

One edge of the shaft 101 is supported by a bearing stand 141, provided at an edge portion of the body of the rotating machine 101, through a ball bearing B1. An intermediate portion and another edge portion of the shaft 101 supported by a bearing stand 142 through a ball bearing B2. A shaft 103 is protrudes toward the outside of the rotating machine 101 from the bearing stand 142. A roller 105 is attached to an edge portion of the shaft 103. The rotating machine 101 creates a rotation-driving force, which is transmitted through the roller 105 toward the object 102 to be driven.

In the above-mentioned rotating machine 101, under effects of the magnetic field produced by the stator 107, a rotating force is imparted to the rotor 106. This rotating force is transmitted to the roller 105 through the shaft 103. In the process of spinning cotton into thread and the like, the roller 105 which is driven to be rotated functions to impart some tension to the thread or it functions to guide the thread in a predetermined course.

In order to cope with the demand to improve productivity, the roller of the rotating machine tends to be enlarged in size. However, when enlarging the size of the roller, the axial-edge load and axial-edge mass applied to the rotating machine should be increased. This may cause a greater amount of imbalance in the rotating system containing the roller in the rotating machine. Based on the amount of imbalance, a greater vibration will be caused in the rotating machine. Such phenomenon of causing vibration due to the imbalance of the rotating system will be described in detail by referring to FIGS. 4 to 6.

In order to avoid the vibration of the rotating system, element causing the vibration should be removed from the construction of the rotating system, and the amount of imbalance of the rotation should also be eliminated. Actually, however, it is difficult to form each of the parts (e.g., rotor) of the rotating system perfectly in a axis-symmetrical shape. In other words, it is very difficult to arrange those parts in the rotating system perfectly in an axis-symmetrical manner. For this reason, a small deviation exits between the center of gravity and the rotation axis in the rotating system. When the rotating body in which the center of gravity deviates from the rotation axis is driven to be rotated, a vibration having a frequency which corresponds to rotation speed is inevitably caused in the rotating body. Other than the deviation of the center of gravity, there exists several kinds of elements which distribute to the amount of imbalance in the rotating system. Such amount of imbalance causes an excitation force in the rotating system, so that a certain vibration is excited in the rotating system.

FIG. 4 is a graph showing a characteristic of the vibration which is produced in the rotating system due to the above-mentioned amount of imbalance. In FIG. 4, characteristic curve A represents a relationship between a number of revolution "N" and an amplitude of the vibration at a point "a" of the roller 105 in the case where the rotating machine 101 is driven to be rotated. In general, the rotating system, which is constructed by the roller, shaft and the like, has a natural frequency of natural vibration. Under the state where the number of revolution of the rotating machine 101 is lower than the natural frequency, the rotating system is hardly affected by the excitation force which is caused due to the amount of imbalance. Therefore, as shown in FIG. 4, only a small vibration having a small amplitude is imparted to the rotor 105. Thus, it is possible to obtain a proper rotation in which an excessive bending stress is not imparted to the shaft as shown in FIG. 5.

However, when the number of revolution of the rotating machine 101 becomes closer to the natural frequency, the rotating system sensitively responds to the excitation force to be created due to the amount of imbalance, so that a large vibration should occur in the roller and the like. FIG. 4 indicates that the amplitude of the vibration at the point "a" of the roller 105 is raised to the maximum when the number of revolutions reaches a frequency N1 of first-order natural vibration (hereinafter, denoted to as a first-order natural frequency N1). Actually, there exist second-order and other higher-order natural vibrations; however, those higher-order natural vibrations are omitted in the graph of FIG. 4. When the above-mentioned large vibration occurs in the roller 105, a relatively big stress is imparted to the shaft 103. In the worst case, the shaft 103 is bent as shown in FIG. 6, which causes an extremely dangerous state for the rotating machine. The bending of the shaft 103 is somewhat exaggerated in FIG. 6 as compared to the actual bending.

In order to prevent the large vibration from being produced in the rotating system, a rated number of revolution "NMAX" of the rotating machine is generally set lower than the first-order natural frequency N1.

However, in order to increase the productivity, the rated number of revolution should be set higher. In order to do so, two countermeasures are required as follows:

① to increase the first-order natural frequency; and

② to reduce the amplitude of the vibration caused when the number of revolutions coincides with the natural frequency.

In order to increase the first-order natural frequency, the diameter of the shaft 103 should be enlarged. However, when enlarging the diameter of the shaft 103, a so-called "dn value" of the ball bearing supporting the shaft 103 must be also increased. However, this results in a reduction of the lifetime of the ball bearing. For this reason, there is a limitation to enlarging the diameter of the shaft.

Meanwhile, when the vibration having the first-order natural frequency N1 occurs in the roller, the amplitude of the vibration is determined by the amount of imbalance and a damping coefficient which is provided for the rotating system. Therefore, a degree of stability of the rotation can be raised by reducing the amount of imbalance; or the damping coefficient can be also increased. Actually, however, there is a limitation in doing this. In short, it is difficult to control (or reduce) the vibration of the roller at the first-order natural frequency.

SUMMARY OF THE INVENTION

It is accordingly a primary object of the present invention to provide a vibration control device which is capable of reducing an amplitude of the natural vibration which is inevitably caused by the rotation of the electric motor.

It is another object of the present invention to provide a vibration control device which is capable of preventing a large vibration from occurring in the rotating machine even when the number of revolutions coincides with the natural frequency of the rotating system.

The vibration control device according to the present invention can be applied to the rotating machine in which a primary yoke is provided within a hollow space of a secondary yoke so that the secondary yoke rotates about a shaft inserted through the primary yoke. According to the fundamental configuration of the present invention, the vibration control device comprises a plurality of electromagnet portions, a pair of sensors and a control portion. The above-mentioned electromagnet portions are arranged around a peripheral surface of the primary yoke, and they at least provide a pair of first and second electromagnet portions and another pair of third and fourth electromagnet portions.

The first electromagnet portion is arranged opposite to the second electromagnet portion with respect to an X-axis direction crossing a sectional area of the primary yoke, while the third electromagnet portion is arranged opposite to the fourth electromagnet portion with respect to a Y-axis direction which is perpendicular to the X-axis direction. One sensor detects a positional displacement between the primary and secondary yokes with respect to the X-axis direction on the basis of a first reference value which is determined in advance. Another sensor detects a positional displacement between the primary and secondary yokes with respect to the Y-axis direction on the basis of a second reference value which is determined in advance.

In the above-mentioned configuration of the vibration control device, the positional displacement detected by one sensor is controlled to be reduced by controlling electric current supplied to the first and second electromagnet portions, while the positional displacement detected by another sensor is controlled to be reduced by controlling electric current supplied to the third and fourth electromagnet portions. By electromagnetically controlling the positional displacement between the primary and secondary yokes with respect to each of the axial directions, the vibration of the shaft is eventually reduced. Hence, the rotating machine can perform a smooth rotation.

The vibration control device according to the present invention can be also applied to another rotating machine in which a secondary yoke is provided within a hollow space of the primary yoke and a shaft is inserted through the secondary yoke so that the secondary yoke rotates together with the shaft within the primary yoke, wherein electromagnet portions are arranged around an interior wall of the primary yoke.

BRIEF DESCRIPTION OF THE DRAWINGS

Further objects and advantages of the present invention will be apparent from the following description, reference being had to the accompanying drawings wherein the preferred embodiments of the present invention are clearly shown.

In the drawings:

FIG. 16 is a sectional view of the rotating machine according to a modified example of the second embodiment of the present invention.

DESCRIPTION OF THE PREFERRED EMBODIMENTS

[A] First Embodiment

Figure 1:
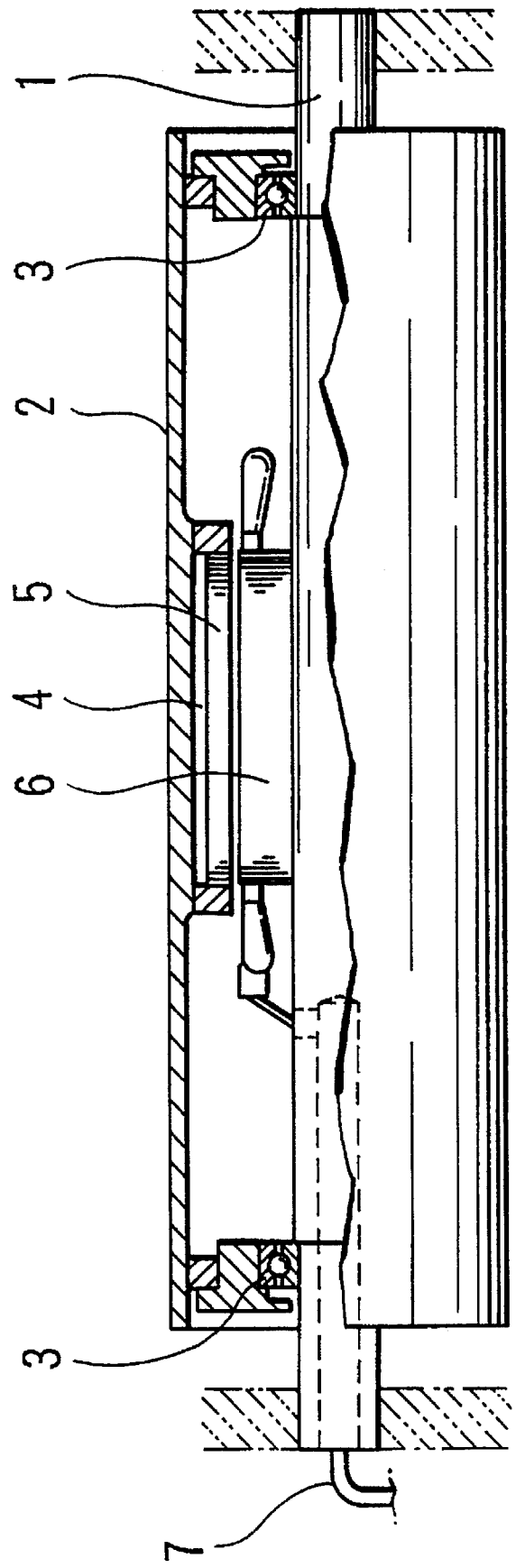
FIG. 1 is a sectional view illustrating the mechanical structure of a high-speed motor.
Figure 7:
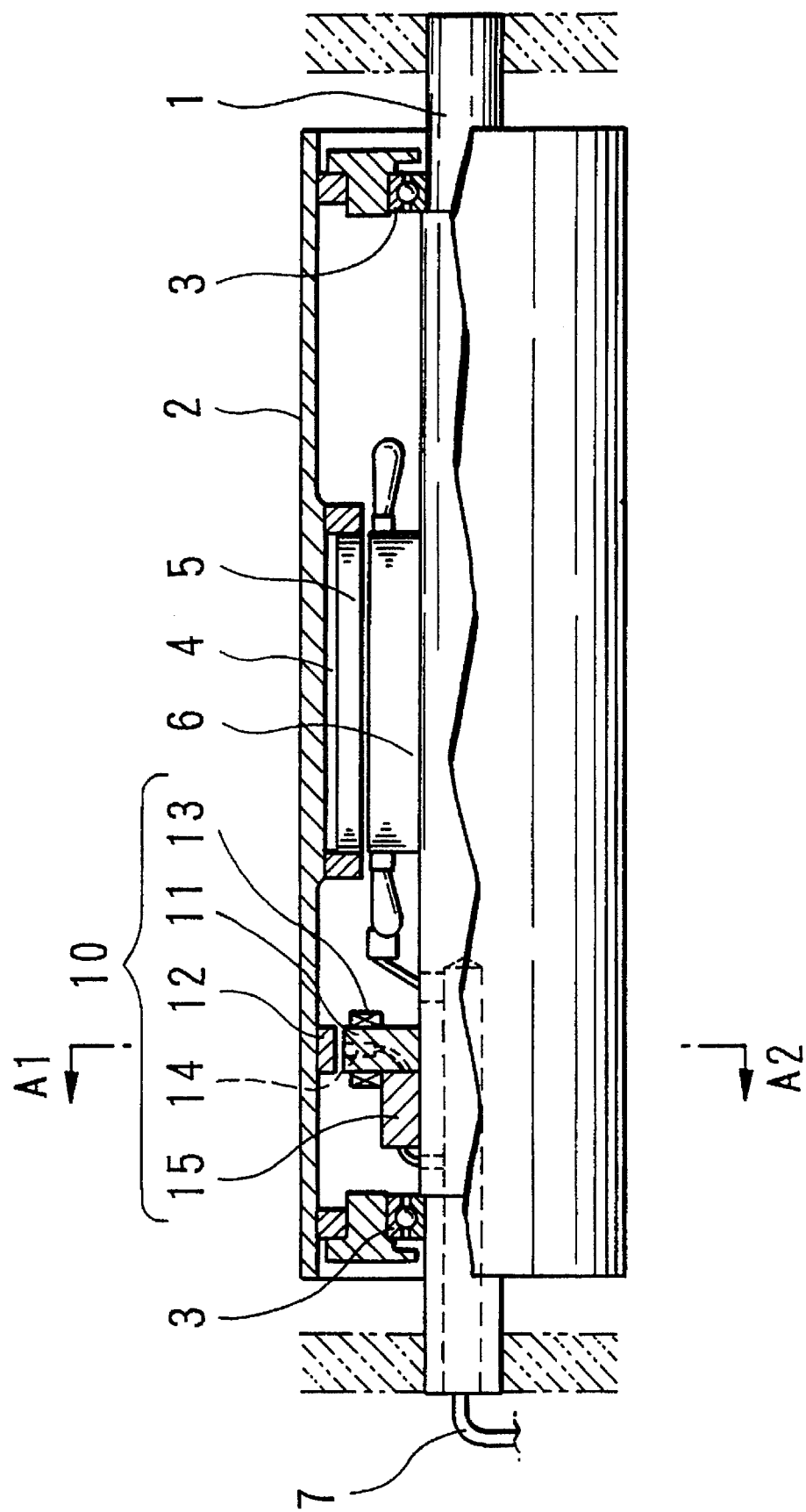
FIG. 7 is a sectional view showing a mechanical structure of the motor providing the vibration control device according to a first embodiment of the present invention.

A first embodiment of the present invention will be described. FIG. 7 is a sectional view showing a mechanical structure of the high-speed motor. As compared to the foregoing motor shown in FIG. 1, the motor shown in FIG. 7 has a vibration control device 10. This vibration control device 10 includes a primary yoke 11, a secondary yoke 12, a coil 13, a sensor 14 and a drive circuit 15. In FIG. 7, parts identical to those shown in FIG. 1 are designated by the same numerals and description thereof will be omitted.

Figure 8:
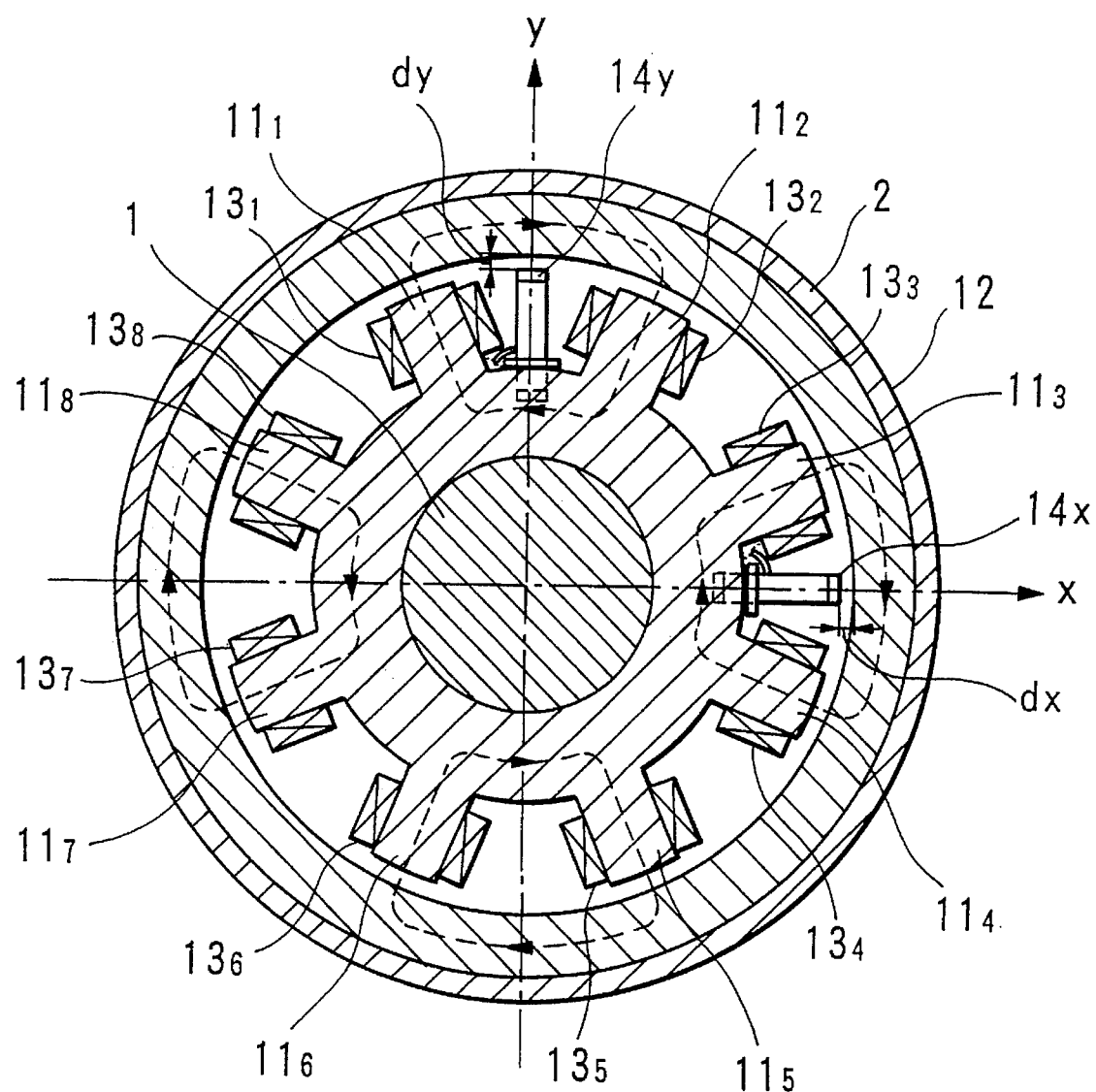
FIG. 8 is a sectional view of a main part of the motor which is take from the view of FIG. 7 with respect to lines A1—A2.

FIG. 8 is a sectional view of a part of the motor, which is taken from the view of FIG. 7 with respect to line A1—A2.

In FIG. 8, the shaft 1 had an attached primary yoke 11 provided with eight magnetic poles $11_1$ to $11_8$ which are arranged in a radial manner. The magnetic poles $11_1$ to $11_8$ have coils thereon $13_1$ to $13_8$ respectively.

Among those coils, each pair of coils are electrically connected together in series or in parallel. For example, the coils $13_1$ and $13_2$ are connected together. Similarly, the coils $13_3$ and $13_4$ are connected together; the coils $13_5$ and $13_6$ are connected together; and the coils $13_7$ and $13_8$ are connected together.

The secondary yoke 12 are attached along the interior surface of the roller 2 such that the secondary yoke 12 faces the magnetic poles $11_1$ to $11_8$. If the roller 2 is made of magnetic materials, the secondary yoke 12 can be omitted. Further, if the eddy-current loss is relatively large, It may be required to re-design the structures of the primary yoke 11 and the secondary yoke 12. In such case, by employing a laminated structure for each of the primary yoke 11 and the secondary yoke 12, it is possible to reduce the eddy-current loss.

When applying electric currents to the coils $18_1$ to $18_8$, the magnetic poles $11_1$ to $11_8$ and the secondary yoke 12 are subjected to electromagnetic forces which are indicated by dotted lines in FIG. 8. Each of the dotted lines represents the lines of magnetic force. In short, the magnetic poles attract the secondary yoke 12.

A sensor 14x senses displacement of an air gap dx in an X-axis direction between the primary yoke 11 and the secondary yoke 12. The displacement of the air gap dx is sensed by referring to a reference value which is set in advance with respect to the air gap dx. Hence, the sensor 14x senses a direction of displacement and an amount of displacement in the X-axis direction with respect to the air gap dx. For example, when the air gap becomes smaller, the sensor 14x outputs the amount of displacement with a negative sign (−). On the other hand, when the air gap between the sensor 14y and the secondary yoke 1 becomes larger, the sensor 14x outputs the amount of displacement with a positive sign (+). Mother sensor 14y senses a displacement of an air gap dy, provided between the primary yoke 11 and the secondary yoke 12, in a Y-axis direction. The displacement of the air gap dy is sensed by referring to a reference value which is set in advance with respect to the air gap dy. Hence, the sensor 14y senses a direction of displacement and an amount of displacement in the Y-axis direction with respect to the air gap dy.

Figure 9:
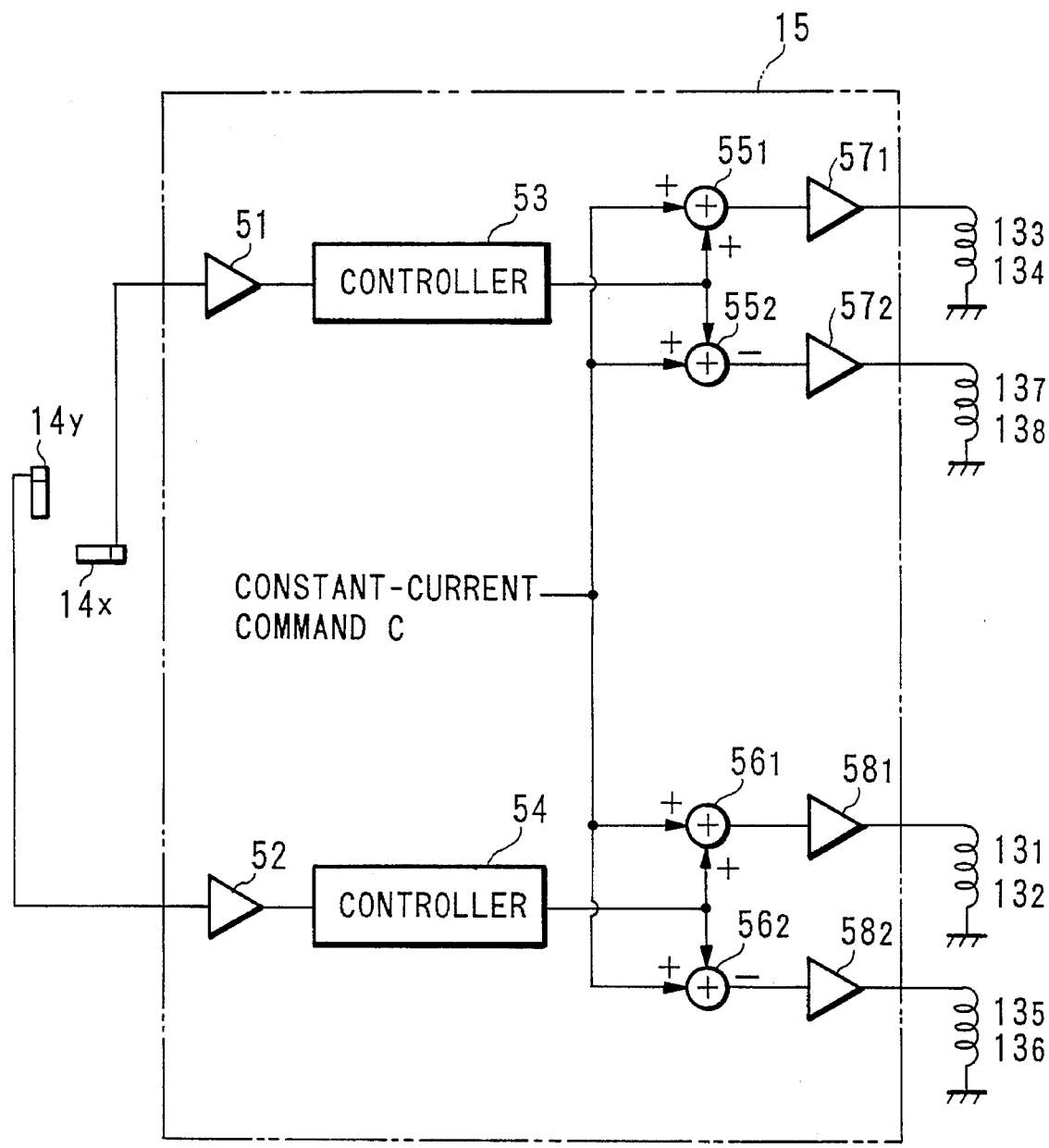
FIG. 9 is a block diagram showing an electric configuration of the first embodiment.

Next, an electric configuration of the first embodiment will be described. An electric circuit containing the sensors 14x, 14y, the drive circuit 15 and the coils $13_1$ to $13_8$ is described in detail by referring to FIG. 9. In FIG. 9, parts identical to those shown in FIG. 8 is designated by the same numerals.

As shown in FIG. 9, a result of the detection obtained by the sensor 14x is subjected to amplification by a sensor amplifier 51; and then, an output of the sensor amplifier 51 is supplied to a controller 53. This controller 53 performs an appropriate operational process on the result of detection of the sensor 14x. For example, a so-called PID operational processes (wherein "PID" means Proportional Integration and Differentiation Operations) is effected by the controller 53. An operational result of the controller 53 is supplied to a first input (+) of an adder $55_1$ as well as a first input (−) of an adder $55_2$. On the other hand, a constant-current command C is supplied to second inputs of each of the adders $55_1$ and $55_2$.

The adder $55_1$ adds the constant-current command C to the operational result of the controller 53. The result of the addition is subjected to current amplification performed by a power amplifier $57_1$. An output of the power amplifier $57_1$ is supplied to the coils $13_3$ and $13_4$.

The adder $55_2$ performs a subtraction by which the operational result of the controller 53 is subtracted from the constant-current command C. The result of the subtraction is subjected to current amplification by a power amplifier $57_2$. An output of the power amplifier $57_2$ is supplied to the coils $13_7$ and $13_8$. The same rate for the current amplification is preferably set to both of the power amplifiers $57_1$ and $57_2$.

A result of detection by sensor 14y is subjected to the same operational processes which are performed with respect to the result of detection of the sensor 14x. More specifically, the result of detection of the sensor 14y is amplified by a sensor amplifier 52, the output of which is then subjected to PID operational process performed by a controller 54. An adder $56_1$ adds the constant-current command C to the output of the controller 54. The result of addition of the adder $56_1$ is subjected to current amplification by a power amplifier $58_1$, the output of which is then supplied to the coils $13_1$ and $13_2$. On the other hand, the operational result of the controller 54 is subtracted from the constant-current command C by another adder $56_2$. An output of the adder $56_2$ is subjected to current amplification performed by a power amplifier $58_2$, the output of which is then supplied to the coils $13_5$ and $13_6$.

Next, operations of the first embodiment will be described.

At first, when the rotation of the roller 2 is stopped, or when the vibration accompanied with the rotation of the roller 2 is too small and is negligible, the air gaps dx and dy between the primary yoke 11 and the secondary yoke 12 are set at their reference values. Hence, output levels of the sensors 14x and 14y are both set at "0", so that the operational results of the controllers 53 and 54 are both set at a zero level. In this case, all of the results of addition of the adders $55_1$, $55_1$, $56_1$ and $56_2$ are equal to the value of the constant-current command C. In other words, the same current is supplied to each of the coils $13_1$ to $13_8$. Thus, the attraction force imparted between the coils $13_1$, $13_2$ and the secondary yoke 12 is canceled by the attraction force imparted between the coils $13_5$, $13_6$ and the secondary yoke 12. Similarly, the attraction force imparted between the coils $13_3$, $13_4$ and the secondary yoke 12 is cancelled by the attraction force imparted between the coils $13_7$, $13_8$ and the secondary yoke 12. In short, the attraction force imparted to the certain coil is balanced with the attraction force imparted to its opposite coil in both of the X-axis direction and Y-axis direction. As a result, the air gaps dx and dy are maintained at their reference values respectively.

Next, the operations of the first embodiment will be described by referring to the state where the vibration of the shaft 1 is excited by the rotation of the roller 2 so that the shaft 1 is subjected to displacement in a certain direction by which the air gap dx is made larger.

In the above-mentioned state, the sensor 14x outputs the amount of displacement with a positive sign (+) on the basis of the reference value. Hence, the operational result of the controller 53 responds to the positive amount of displacement of the air gap dx. In this case, the adder $55_1$ produces a signal representing the result of the addition in which the operational result of the controller 53 is added with the constant-current command C. Based on the signal outputted from the adder $55_1$, the attraction force produced by the coils $13_3$ and $13_4$ is made larger. On the other hand, the adder $55_2$ produces a signal representing the result of subtraction in which the operational result of the controller 53 is subtracted from the constant-current command C, so that the attraction force produced by the coils $13_7$ and $13_8$ is made smaller.

Due to an imbalance between the attraction force produced by the coils $13_3$, $13_4$ and the attraction force produced by the coils $13_7$, $13_8$, the primary yoke 11 is moved in a positive direction (+) of X axis (i.e., a right-side direction in FIG. 8) within the secondary yoke 12. As described before, the rigidity of the roller 2 is made higher than the rigidity of the shaft 1. Hence, the aforementioned displacement of the shaft 1, which is effected such that the air gap dx is made larger, is canceled by the above-mentioned imbalance of the attraction force by which the air gap dx is made smaller.

In contrast, when the vibration of the shaft 1 is excited by the rotation of the roller 2 so that the displacement of the shaft 1 is caused in a direction by which the air gap dx is made smaller, the sensor 14x outputs the amount of displacement with the negative sign (−) on the basis of the reference value. In this case, the adder $55_1$ eventually performs a subtraction in which an absolute value of the operational result of the controller 53 is subtracted from the constant-current command C, so that the attraction force produced by the coils $13_3$ and $13_4$ is made smaller. On the other hand, the adder $55_2$ eventually performs an addition in which the absolute value of the operational result of the controller 53 is added to the constant-current command C, so that the attraction force produced by the coils $13_7$, $13_8$ is made larger.

Due to an imbalance between the attraction force produced by the coils $13_3$, $13_4$ and the attraction force produced by the coils $13_7$, $13_8$, the primary yoke 11 is moved in a negative direction (−) of X axis (i.e., a left-side direction in FIG. 8) within the secondary yoke 12. Hence, the aforementioned displacement of the shaft 1, which is effected such that the air gap dx is made smaller, is canceled by the above-mentioned imbalance of the attraction force by which the air gap dx is made larger.

In short, there is formed a feedback loop which can be described as follows: sensor 14x→ drive circuit 15→ attraction force of coils $13_3$, $13_4$ and attraction force of coils $13_7$, $13_8$→sensor 14x (which detects the displacement), wherein an arrow "→" represents a direction in which a state of a former element affects a state of a latter element. Since the above-mentioned feedback loop is established in the X-axis direction, a positional relationship between the shaft 1 and the roller 2 is controlled such that the air gap dx is normally maintained at the reference value.

Similar control is performed with respect to the Y-axis direction as well. In short, there is formed a feedback loop which is established in the Y-axis direction and is described as follows: sensor 14y→ drive circuit 15→ attraction force of coils $13_1$, $13_2$ and attraction force of coils $13_5$, $13_6$→ sensor 14y (which detects the displacement). Due to the above-mentioned feedback loop in the Y-axis direction, the positional relationship between the shaft 1 and the roller 2 is controlled such that the air gap dy is normally maintained at the reference value.

The first embodiment described heretofore is characterized by providing a displacement control independently for each of the X-axis direction and the Y-axis direction. Therefore, over the entire area of the rotation as shown in FIG. 8, the air gaps dx and dy formed between the primary yoke 11 and the secondary yoke 12 are controlled to be maintained at their reference values. Thus, even if the natural vibration of the shaft 1 is excited by the rotation of the roller 2 so that a level of the amplitude of the natural vibration reaches a peak level, it is possible to control the amplitude to be extremely small.

Figure 2A:
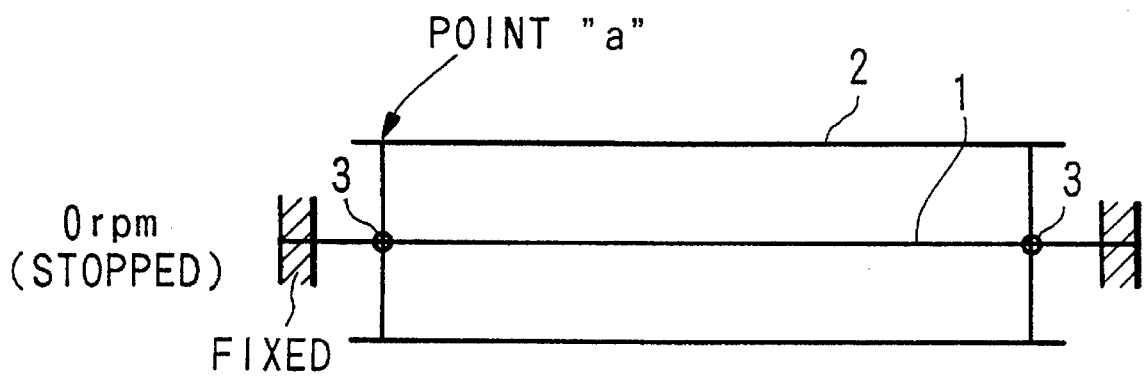
FIGS. 2A to 2C are drawings each showing a manner of vibration of the motor in connection with the number of revolution.
Figure 2B:
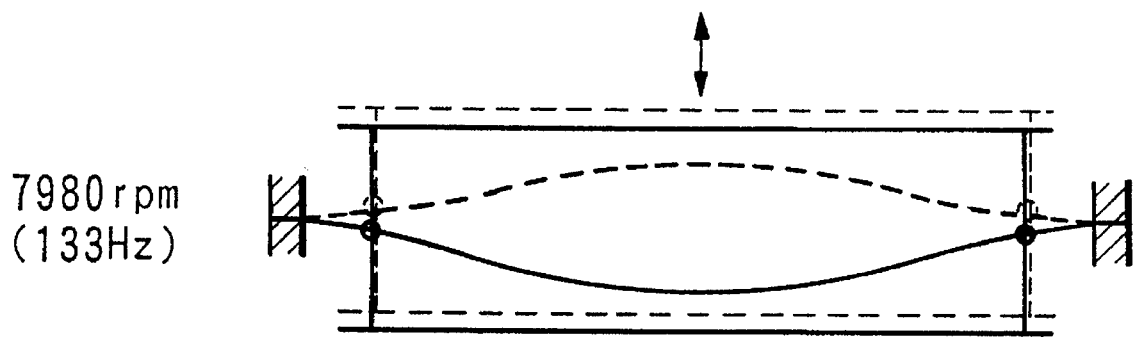
Figure 2C:
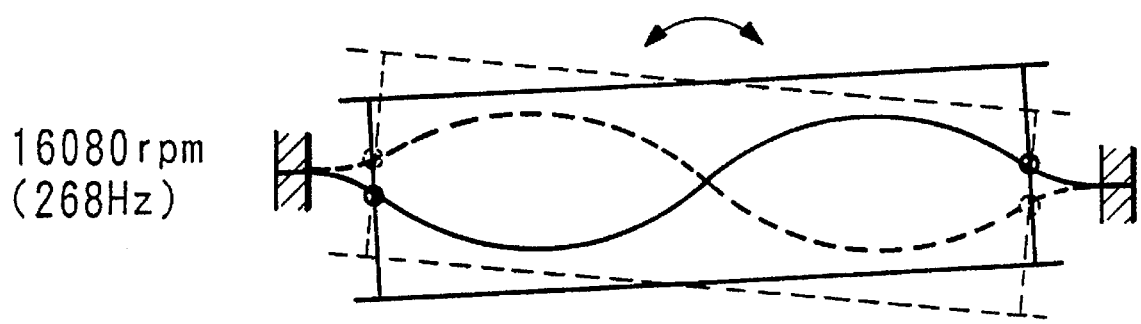
Figure 10:
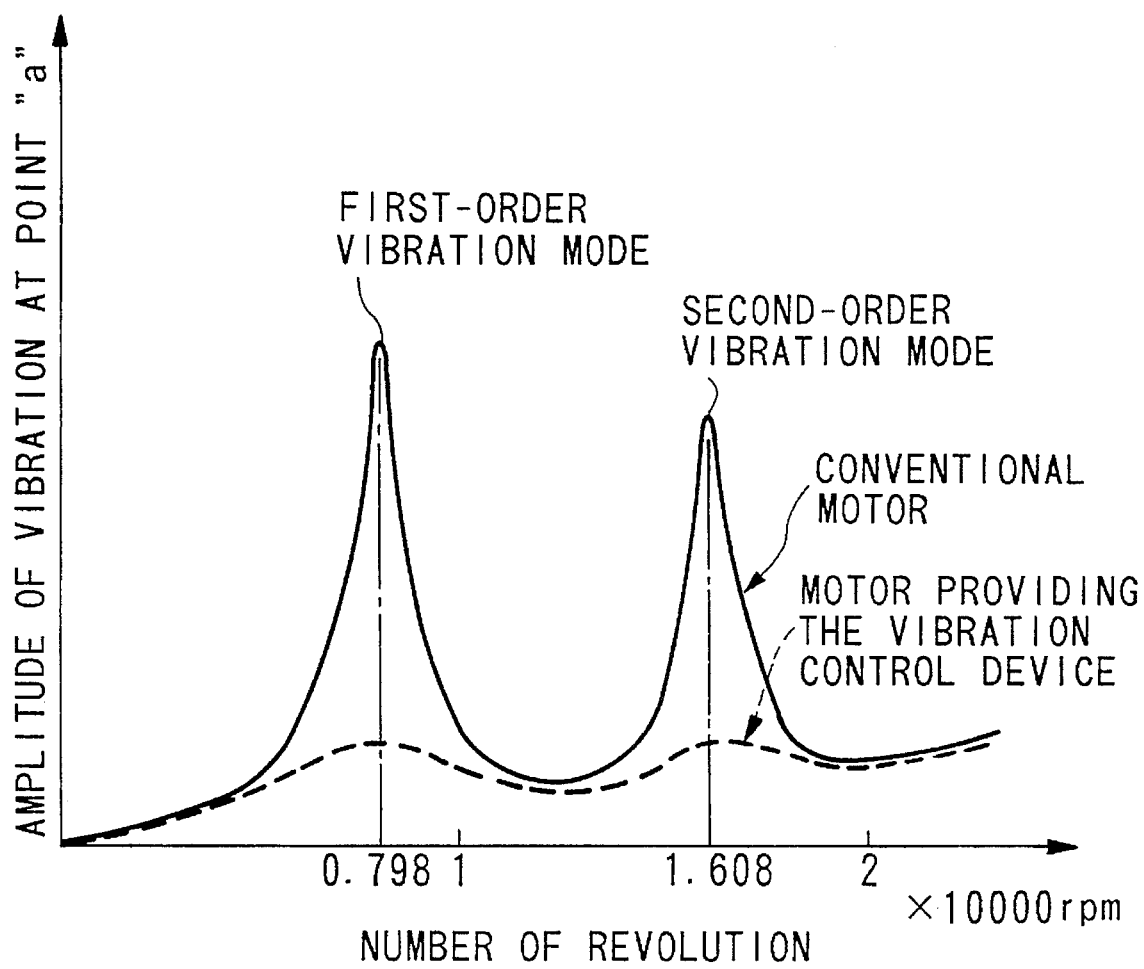
FIG. 10 is a graph showing a relationship between the number of revolution of the roller and the amplitude of the vibration.

FIG. 10 is a graph showing a relationship between the number of revolution of the roller 2 and the amplitude of the vibration at the point "a" (indicating an edge point of the peripheral surface of the roller 2 shown in FIG. 2A). As shown in this graph, in the conventional motor, the natural vibrations sequentially occur as the number of revolutions of the roller 2 increases. Thus, the amplitude of the vibration at the point "a" reaches a peak level twice at 7,980 [rpm] and 16,080 [rpm].

Even in the motor providing the vibration control device according to the first embodiment, as similar to the conventional motor, the natural vibration may occur as the number of revolution of the roller 2 increases. However, it is observed from the graph (see dotted line) that the peak level of the amplitude of the vibration can be reduced smaller as compared to that of the conventional motor under effects of the vibration control device.

Therefore, the motor providing the vibration control device according to the first embodiment can suppress the vibration to be smaller within the whole range of the number of revolutions up to the substantially maximum number of revolutions. Thus, it is not required for the motor to avoid the certain range of the number of revolutions which cause the natural vibrations. In other words, the motor providing the present device can arbitrarily use any range of the number of revolutions.

In the description of the first embodiment, positions to locate the primary yoke 11 and the secondary yoke 12 are not described specifically. In order to obtain the largest effect in the suppression of the vibration, it is obvious for us to locate the vibration control device at the position corresponding to the vibration mode, to be suppressed, of the natural vibration of the shaft 1.

Since the present device can be built in the inside of the motor, it is not required to provide any external space for the device.

Figure 11:
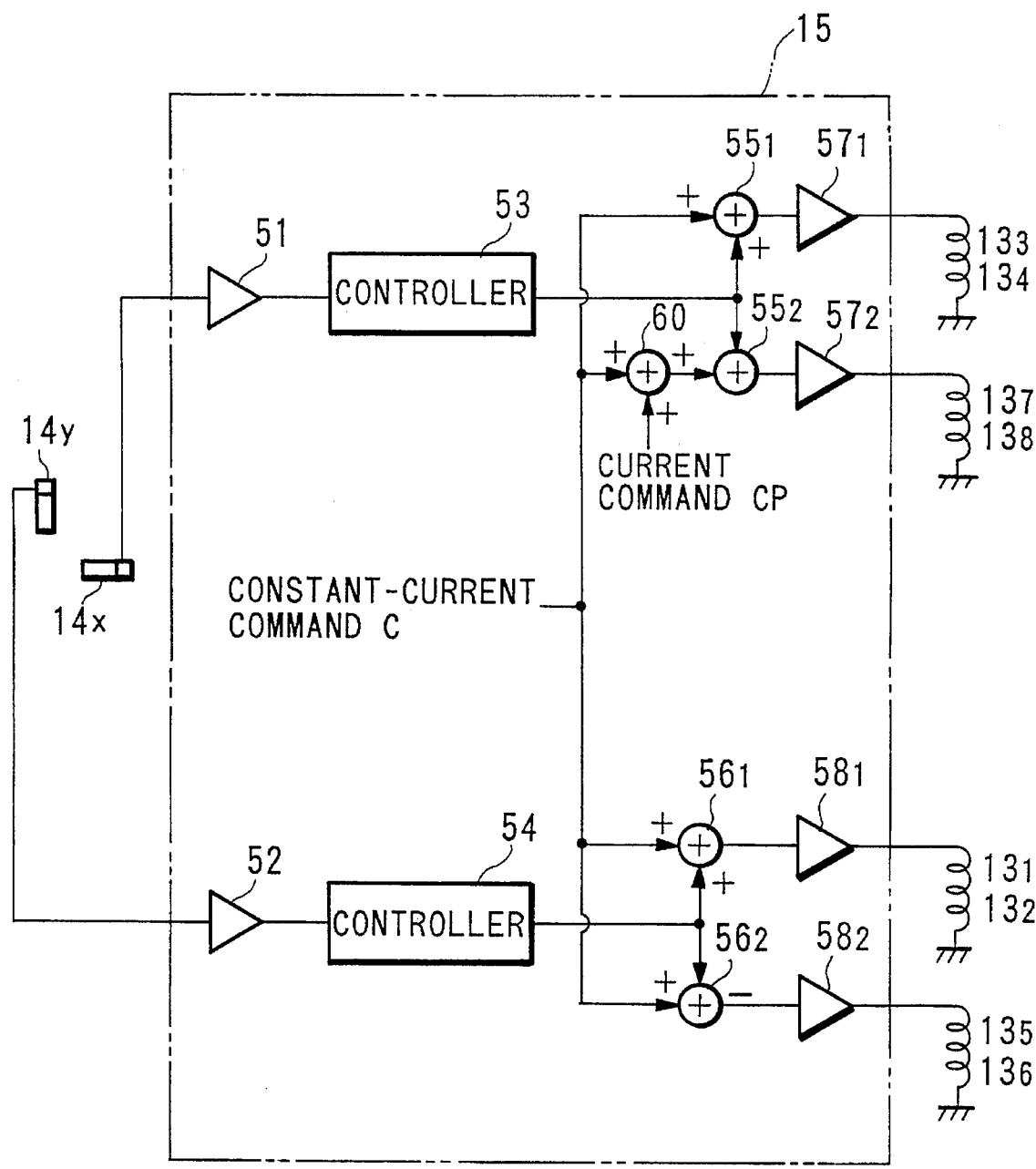
FIG. 11 is a block diagram showing a modification example of the first embodiment.

In the electric circuit shown in FIG. 9, the operational result corresponding to the amount of displacement in each axial direction is added to or subtracted from the same constant-current command C. However, in order to cope with the situation where the roller 2 is pressed against the external equipment in the X-axis direction (see FIG. 8) to transmit the rotation force to it, the electric circuit can be re-designed as shown in FIG. 11. As compared to the electric circuit shown in FIG. 9, the electric circuit shown in FIG. 11 is characterized by providing an adder 60 which receives a current command CP representing a pressure when the roller 2 is pressed against the external equipment. This adder 60 adds the foregoing constant-current command C with the current command CP; and then, a result of addition is supplied to the adder $55_2$. In the adder $55_2$, the operational result of the controller 53 is subtracted from the result of addition of the adder 60. Thus, the current command CP is further incorporated into the current flowing through the coils $13_7$ and $13_8$ which are located with respect to the X-axis direction in FIG. 8. Due to the addition of the current command CP, the pressure to press the roller 2 is provided as a offset value in advance. Thus, when the peripheral surface of the roller 2 is pressed to the hobbin winder, it is possible to reduce the load to be imparted to the bearing 3, or it is possible to arbitrarily alter the spring constant at a moment when pressing the roller 2 to the hobbin winder.

Figure 12:
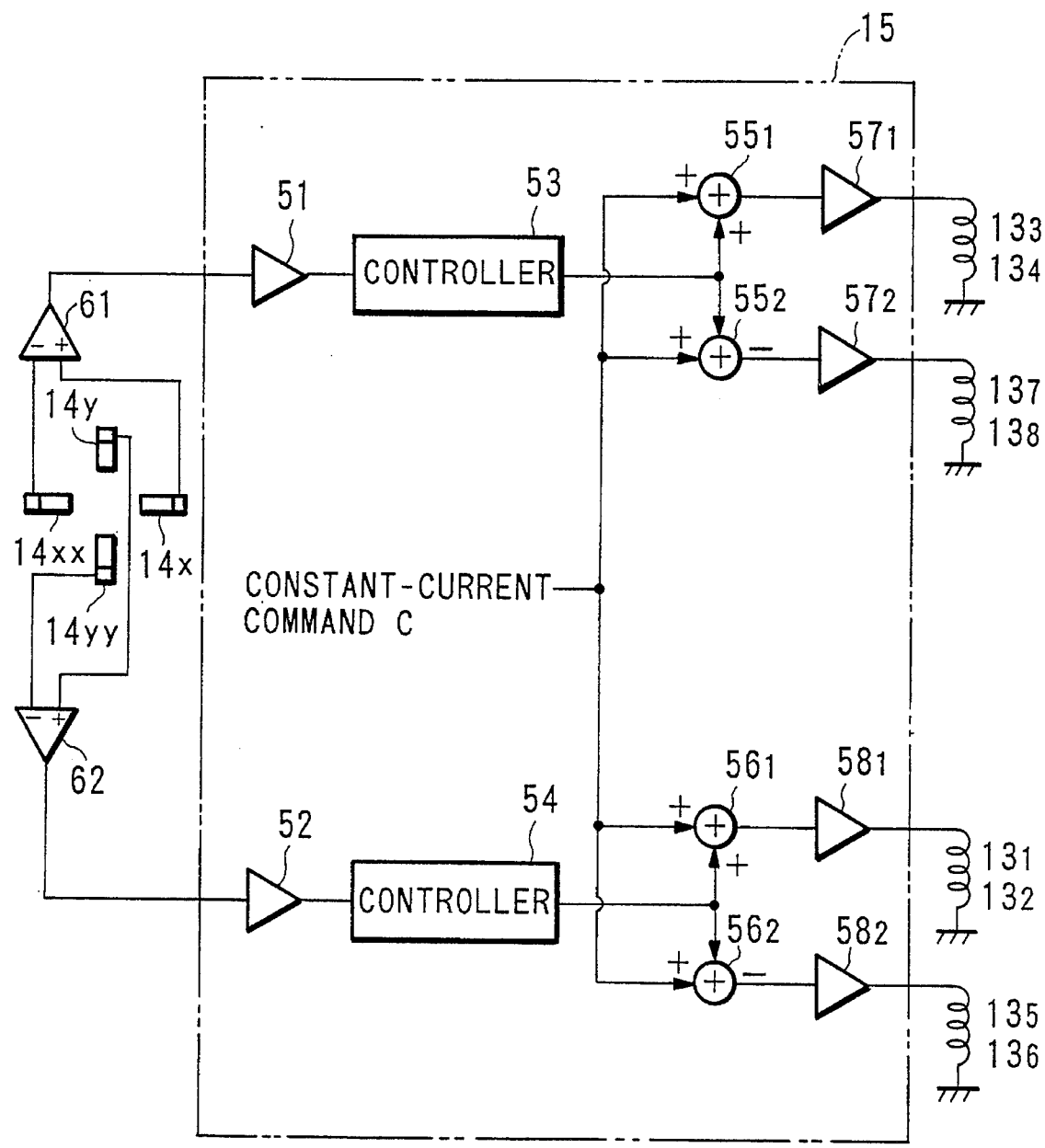
FIG. 12 is a block diagram showing another modification example of the first embodiment.

In the first embodiment, one sensor (i.e., 14x or 14y) is provided to detect the displacement of the shaft 1 in each of the X-axis direction and Y-axis direction. However, it is possible to provide a pair of sensors with respect to each axial direction as shown in FIG. 12. Herein, a sensor 14xx is provided at an opposite-side position of the sensor 14x with respect to the center of the shaft 1 (or origin), while a sensor 14yy is provided at an opposite-side position of the sensor 14y with respect to the center of the shaft 1. A differential amplifier 61 detects a difference between the outputs of the sensors 14x and 14xx so as to produce a differential output which is then supplied to the sensor amplifier 51. Similarly, a differential amplifier 62 detects a difference between the outputs of the sensors 14y and 14yy so as to produce a differential output which is then supplied to the sensor amplifier 52. Due to the provision of the two sensors with respect to each axial direction, it is possible to double the sensitivity of detection for the amount of displacement of the shaft 1. Further, it is possible to cancel the noise of the sensor and the variation in the characteristic of the sensor, wherein such variation is caused due to the variation of the temperature. In short, it is possible to improve the precision for the measurement of the displacement of the shaft 1.

[B] Second Embodiment

Figure 13:
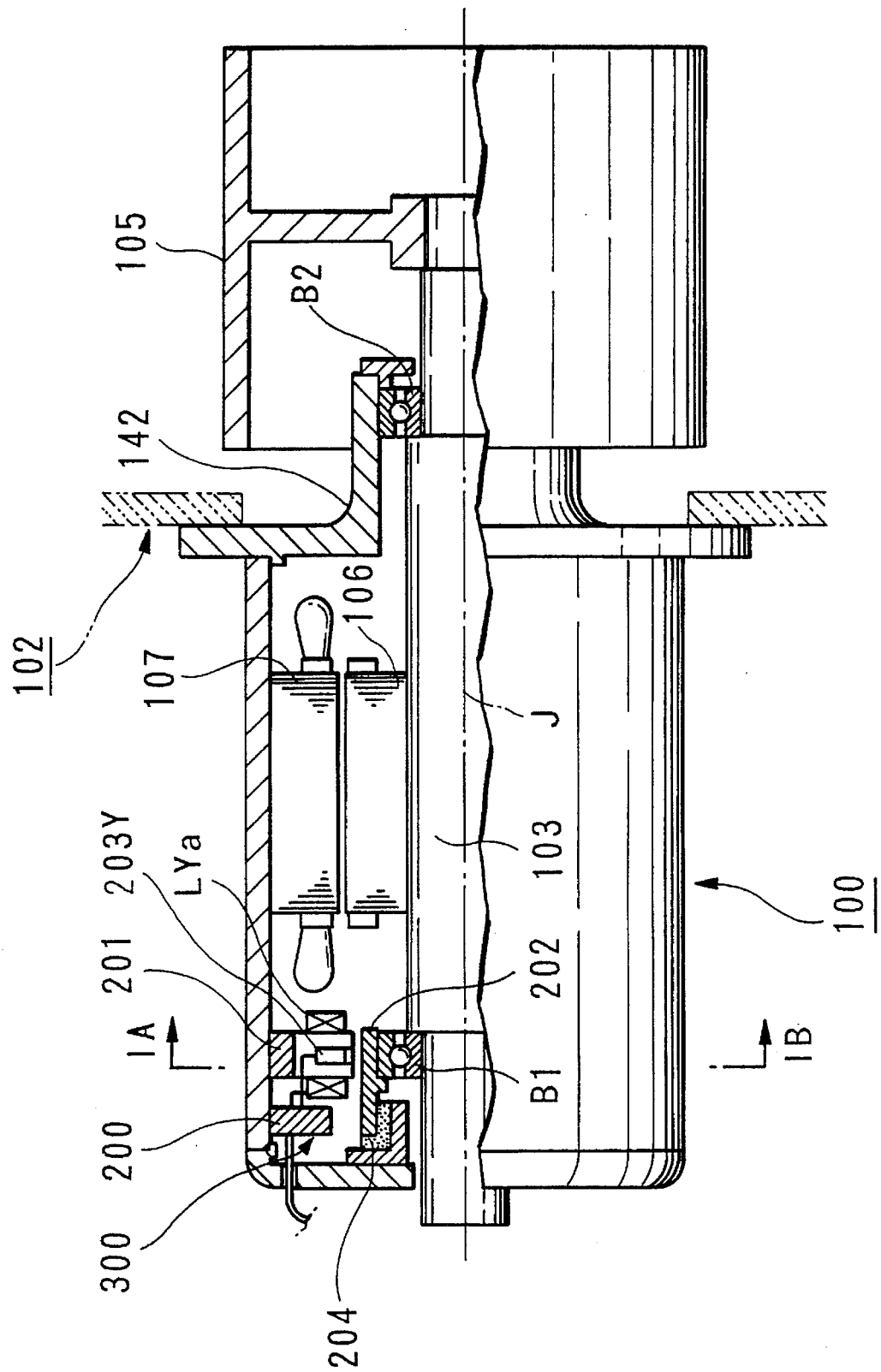
FIG. 13 is a sectional view of the rotating machine providing a vibration control device according to a second embodiment of the present invention.
Figure 14:
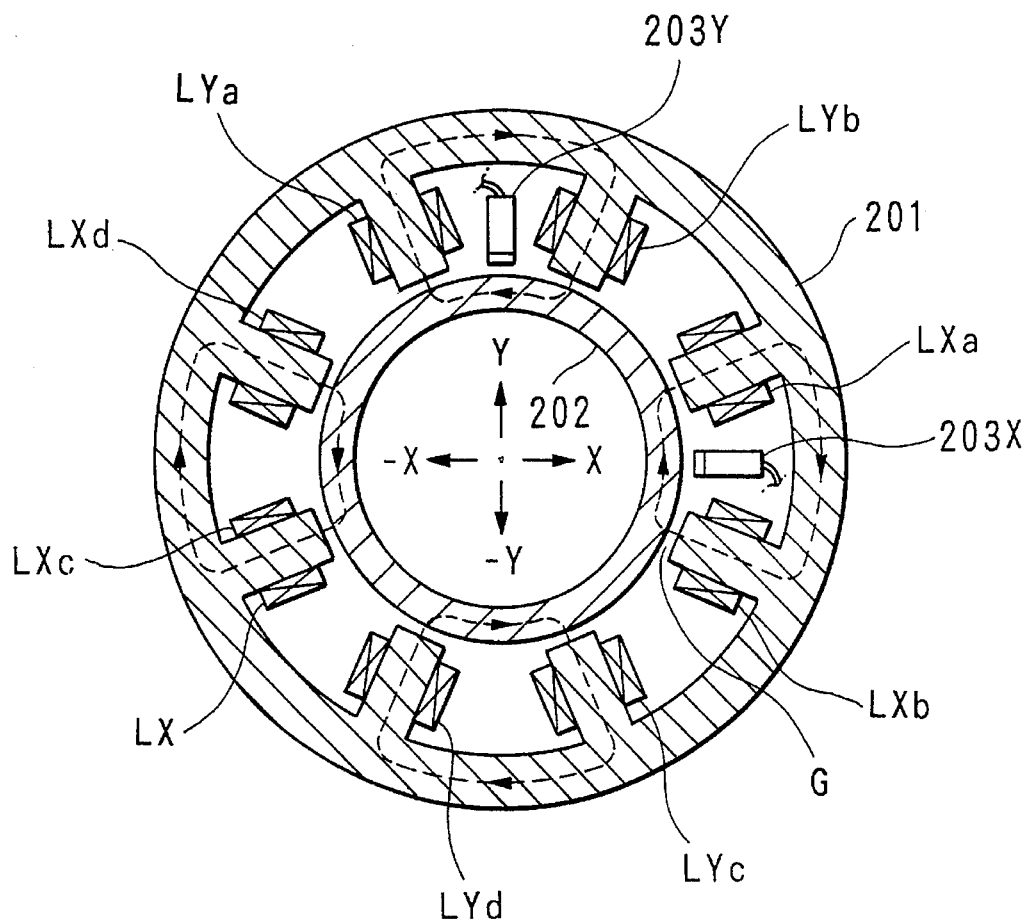
FIG. 14 is a sectional view of a main part of the rotating machine which is taken from the view of FIG. 13 with respect to line IA—IB.

FIG. 13 is a sectional view illustrating a mechanical structure of the rotating machine providing a vibration control device 300 according to a second embodiment of the present invention. FIG. 14 is a sectional view illustrating a main part of the rotating machine which is taken from the view of FIG. 13 with respect to line IA—IB. In order to avoid illustrating the complicated construction, the illustration of FIG. 14 is somewhat simplified by omitting some parts such as the rotor of the rotating machine 100.

Figure 3:
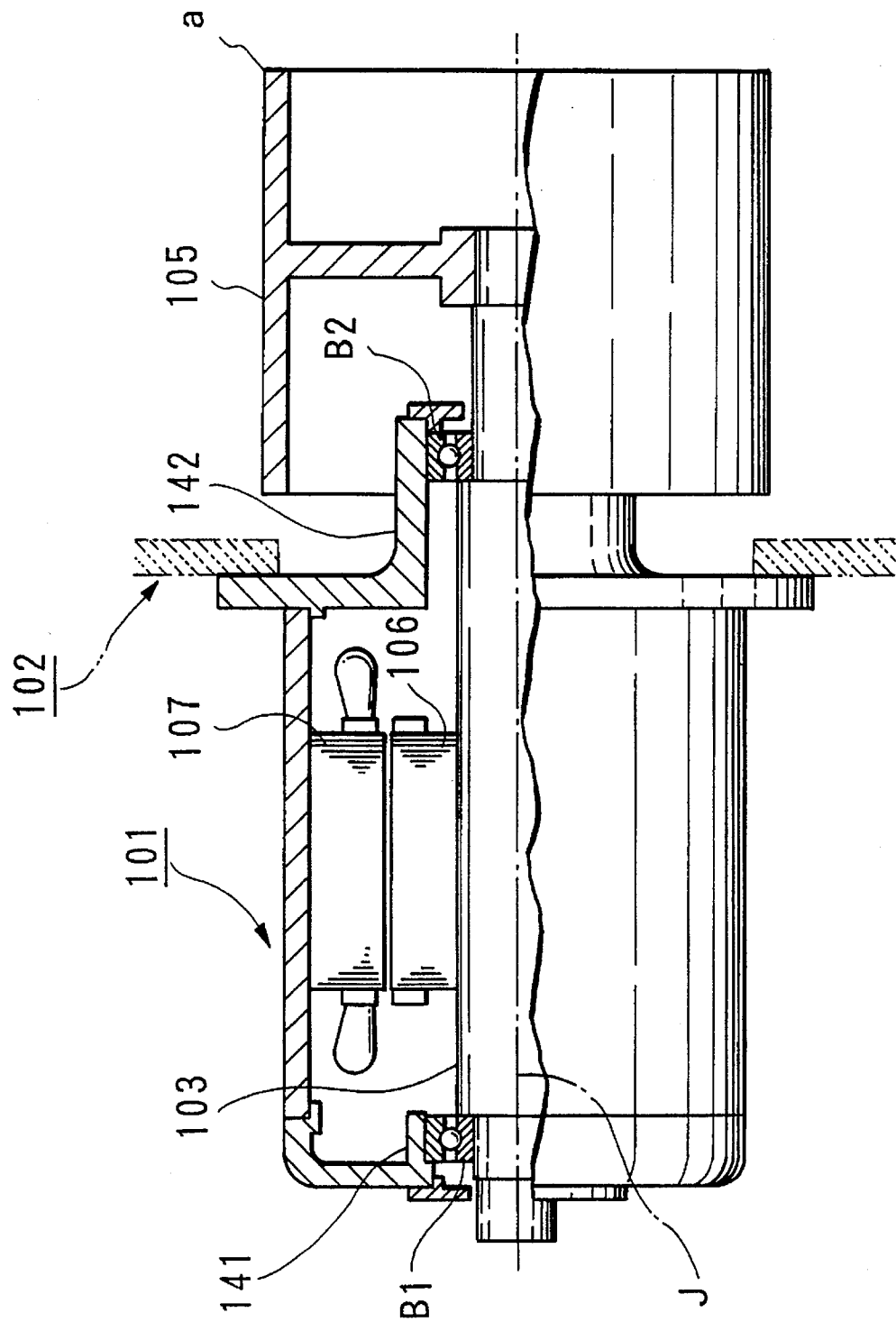
FIG. 3 is a sectional view showing a part of the mechanical structure of the rotating machine.

In the conventional rotating machine as shown in FIG. 3, both-side edges of the shaft 103 are supported by the bearing stands through the ball bearings. As compared to such construction of the conventional rotating machine, the rotating machine 100 shown in FIG. 13 is characterized by providing the vibration control device 300 instead of the bearing stand 141.

In FIGS. 13 and 14, a numeral 202 denotes a secondary yoke having a cylindrical shape, through which the shaft 103 is inserted. An approximately half portion of the cylinder of the secondary yoke 202 supports the shaft 103 through the ball bearing B1, while another remaining portion is securely fixed to an edge portion of the body of the rotating machine by means of an elastic member 204 which is made of rubber, a metal spring and the like.

A primary yoke 201 having an annulus-ring-like shape is provided to face the secondary yoke 202, so that the two yokes are arranged in a concentric manner. The primary yoke 201 is attached to an interior wall of the body of the rotating machine. Eight magnetic poles are projected from an interior wall of the primary yoke 201 such that they are projected toward a peripheral surface of the secondary yoke 202. Those magnetic poles are respectively wound by coils LYa, LYb, LXa, LXb, LYc, LYd, LXc and LXd. Among those coils, only the coil LYa is shown in FIG. 13.

The coils LYa and LYb are connected together in series or in parallel. By supplying electric current to these coils, magnetic flux is formed and is passing through a magnetic path which sequentially passes through the primary yoke 201, the magnetic pole wound by the coil LYb, the secondary yoke 202, the magnetic pole wound by the coil LYa and the primary yoke 201. Due to the magnetic flux relating to the coils LYa and LYb, the secondary yoke 202 is attracted toward the primary yoke 201 in a Y-axis direction. The same thing can be said to each pair of the coils among a pair of the coils LXa and LXb, a pair of the coils LYc and LYd and a pair of the coils LXc and LYd. In short, a pair of two coils and their magnetic poles function like an electromagnet by which the secondary yoke 202 is attracted toward primary yoke 201 in a certain axial direction. A pair of the coils LYa and LYb and their magnetic poles are provided to form an electromagnet by which the secondary yoke 202 is attracted toward the primary yoke 201 in a (+Y)-axial direction. Similarly, a pair of the coils LXa and LXb and their magnetic poles are provided to form an electromagnet by which the secondary yoke 202 is attracted in a (+X)-axial direction; a pair of the coils LYc and LYd and their magnetic poles are provided to form an electromagnet by which the secondary yoke 202 is attracted in a (−Y)-axial direction; and a pair of the coils LXc and LXd and their magnetic poles are provided to form an electromagnet by which the secondary yoke 202 is attracted in a (−X)-axial direction. In some cases, eddy currents occur in the primary yoke 201 and the secondary yoke 202, so that those eddy currents may act like a disturbance for the secondary yoke 202. In the case where the effects of those eddy currents cannot be overlooked, it is possible to reduce those eddy currents by re-designing each of the primary yoke 201 and the secondary yoke 202 in the laminated structure.

Meanwhile, a distance sensor 203X is provided in an X-axis direction between the primary yoke 201 and the secondary yoke 202, while another distance senor 203Y is provided in a Y-axis direction between the primary yoke 201 and the secondary yoke 202. The distance sensors 203X and 203Y detect X-axis distance and Y-axis distance respectively with respect to the secondary yoke 202 so as to produce distance signals respectively. Among those distance sensors, only the distance sensor 203Y is shown in FIG. 13. As the distance sensors 203X and 203Y, it is possible to employ an eddy-current-type sensor, optical sensor and the like.

The detection signals given from the distance sensors 203Y and 203X are supplied to the vibration control circuit 200 shown in FIG. 13. The vibration control circuit 200 is activated by the detection signal of the distance sensor 203Y so as to eventually control the vibration in the X-axis direction. Similarly, the vibration control circuit 200 is also activated by the detection signal of the distance sensor 203X so as to eventually control the vibration in the Y-axis direction. Such axis-directional control for the vibration is performed by controlling electric current flowing through the coils. By controlling the electric current, the intensity of the magnetic flux produced by the coils is controlled. In the present embodiment, the vibration control circuit 200 controls amounts of the electric currents flowing through the coils LYa, LYb, LXa, LXb, LYc, LYd, LXc and LXd respectively.

Figure 15:
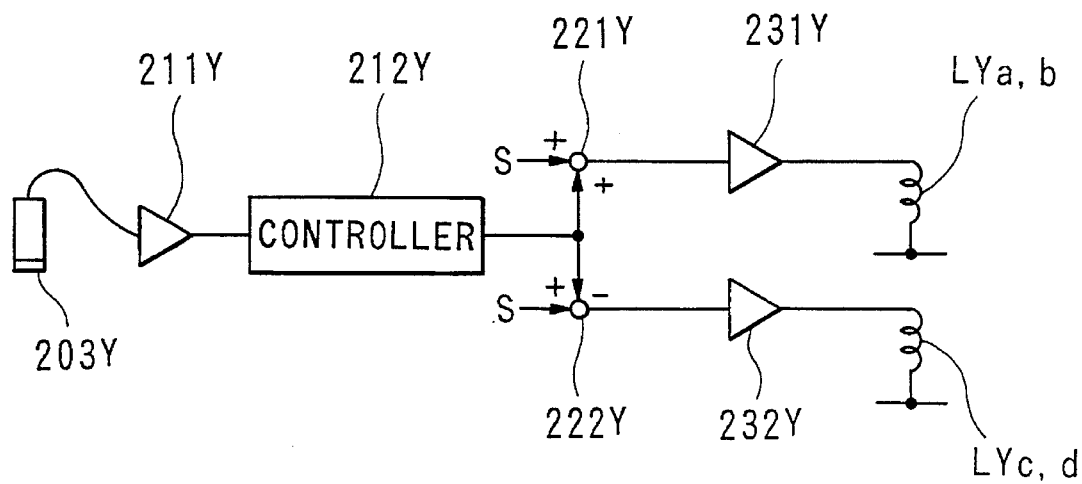
FIG. 15 is a circuit diagram showing a part of a vibration control circuit in connection with a Y- control for the vibration.

FIG. 15 is a circuit diagram showing a part of the vibration control circuit 200 which relates to a Y-axis control for the vibration of the secondary yoke 202. In FIG. 15, the detection signal given from the distance sensor 203Y is supplied to a controller 212Y through a sensor amplifier 211Y. The controller 212Y performs predetermined processing, including a PID control process, on an output signal of the sensor amplifier 211Y. Then, an output signal of the controller 212Y is delivered to an adder 221Y and a subtracter 222Y. The output signal of the controller 212Y contains three elements, i.e., a proportional element (P), an integrated element (I) and a differentiated element (D). Among them, the proportional element (P) is set at "0" under the state where shaft 103 is not vibrated so that the secondary yoke 202 is located at an ideal location. If the location of the secondary yoke 202 is deviated from the ideal location in the (+Y)-axial direction, the proportional element (P) has a negative value whose absolute value corresponds to an amount of (+Y)-axial displacement of the secondary yoke 202. In contrast, when the location of the secondary yoke 202 is deviated from the ideal location in the (−Y)-axial direction, the proportional element (P) has a positive value whose absolute value corresponds to an amount of (−Y)-axial displacement of the secondary yoke 202. Both of the proportional element (P) and integrated element (I) described above function as a control signal which controls the location of the secondary yoke 202 to be maintained at the predetermined location. The differentiated element (D) functions as a control signal which produces a damping coefficient of the vibration of the rotating system. The adder 221Y adds the output signal of the controller 212Y to a constant-current command S. The subtracter 222Y subtracts the output signal of the controller 212Y from the constant-current command S. Output signals of the adder 221Y and the subtracter 222Y are supplied to power amplifiers 231Y and 232Y respectively. The power amplifier 231Y drives the coils LYa and LYb, while the power amplifier 232Y drives the coils LYc and LYd.

The above-mentioned configuration of the circuit portion relates to the Y-axial vibration control. The vibration control circuit 200 further provides another circuit portion, having the same configuration, which relates to the X-axial vibration control. More specifically, another circuit portion controls the amount of electric current to be supplied through the coils LXa, LXb, LXc and LXd on the basis of the detection signal of the distance sensor 203X.

Next, operation of the second embodiment will be described in detail. Under the effect of the magnetic field produced by the stator 107, the rotor 106 is driven to be rotated, so that the shaft 103 is rotated. Now, when the number of revolution of the rotating machine 101 is lower than the first-order natural frequency and any large vibration has not occurred on the shaft 103 so that the secondary yoke 202 is located at the ideal location described before, the output signal of the controller 212Y is set at a zero level. In this situation, the electric current corresponding to the constant-current command S flows through each of the coils. Hence, an equal magnetic force is effected on the secondary yoke 202 in each of the (+Y)-axis direction, (+X)-axis direction, (−Y)-axis direction and (−X)-axis direction, so that the secondary yoke 202 is attracted by the equal force in each of those four directions. Thus, the location of the secondary yoke 202 is maintained at the ideal location.

On the other hand, when the number of revolutions of the rotating machine 101 is close to the natural frequency, the large vibration may be easily produced on the shaft 103 in its traverse direction. If such vibration is produced, the vibration is transmitted to the secondary yoke 202 through the ball bearing B1. For example, if the vibration which is effected in the (+Y)-axis direction and (−Y)-axis direction is caused for the secondary yoke 202, a positional displacement of the secondary yoke 202 is sensed by the distance sensor 203Y whose output signal is sent to the controller 212Y through the sensor amplifier 211Y. Thus, the controller 212Y produces a signal corresponding to the amount of the positional displacement of the secondary yoke 202. Herein, the proportional element (P) within the output signal of the controller 212Y has a negative value when the direction of the positional displacement of the secondary yoke 202 coincides with the (+Y)-axis direction. Due to the negative value of the proportional element (P), the amount of electric current flowing through the coils LYa and LYb is reduced, while the amount of electric current flowing through the coils LYc and LYd is increased. In contrast, when the direction of the positional displacement of the secondary yoke 202 coincides with the (−Y)-axis direction, the proportional element (P) has a positive value. Hence, the amount of electric current flowing through the coils LYa and LYb is increased, while the amount of electric current flowing through the coils LYc and LYd is reduced. Since the integrated element (I) accompanied with the proportional element (P) within the output signal of the controller 212Y is used to control the amount of electric current to be supplied through each of the coils, the location of the shaft 103 is controlled to be maintained at the predetermined location under the effects of the positional control of the secondary yoke 202. Incidentally, the differentiated element (D) contained in the output signal of the controller 212Y may contribute to the control of the amount of electric current flowing through each coil at a certain phase-timing which is advanced from that of the proportional element (P). In short, the differentiated element (D) achieves a function to increase the damping coefficient of the rotating system containing the shaft 103. The same thing can be said for the X-axial control of the vibration of the secondary yoke 202. In this case, the same vibration control, which is effected in the Y-axis direction, is also effected in the X-axis direction on the basis of the detection signal given from the distance sensor 203X.

Figure 4:
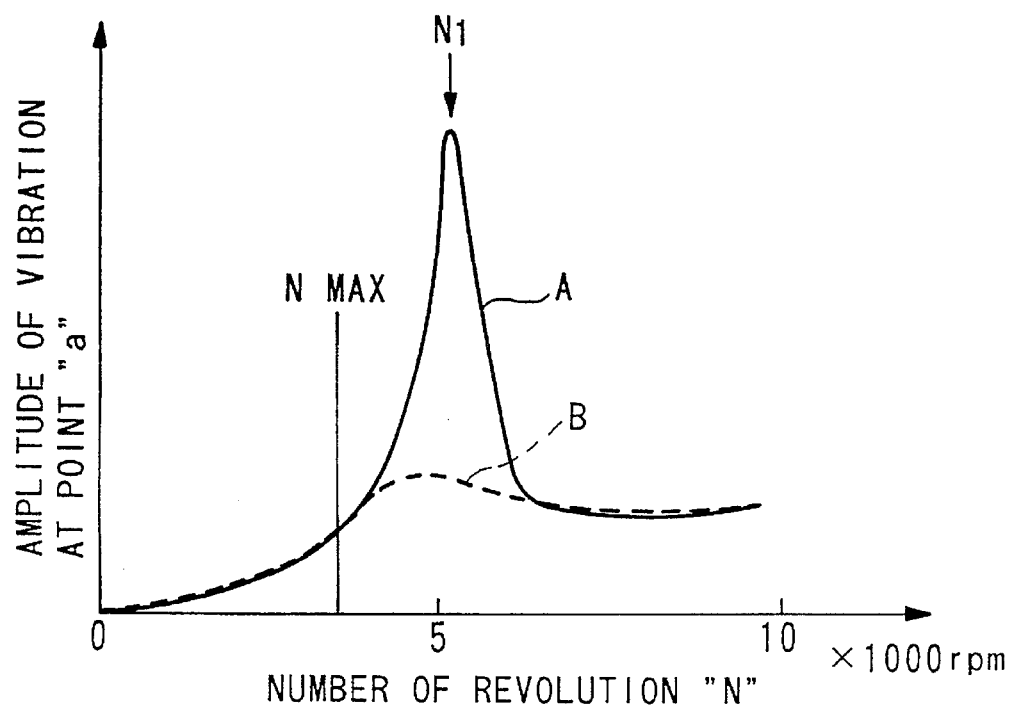
FIG. 4 is a graph showing a relationship between the number of revolutions and the vibration occurring at the roller of the rotating machine.
Figure 5:
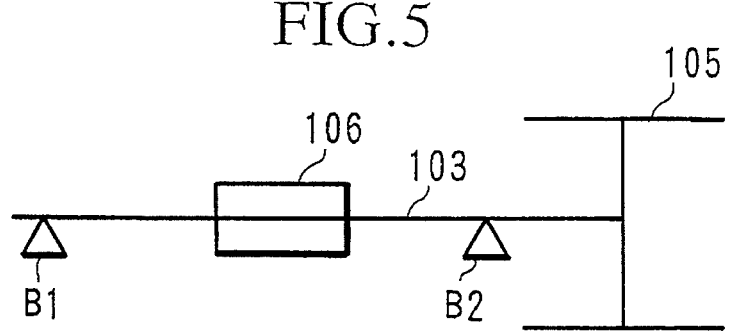
FIG. 5 is a drawing showing the behavior of the rotating machine in the condition where the number of revolutions does not coincide with the natural frequency of the natural vibration occurring in the rotating machine.
Figure 6:
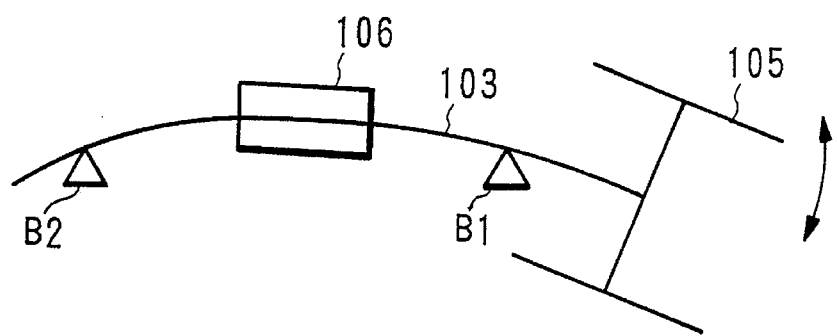
FIG. 6 is a drawing showing a behavior of the rotating machine under the state where the number of revolution coincides with the natural frequency of the rotating machine.

According to the operations of the vibration control device described above, even if the number of revolution of the rotating machine coincides with the natural frequency so that the shaft 103 is set in the situation where a large vibration is easily produced, it is possible to effectively reduce the vibration; hence, the operations of the rotating machine can be set in a stabilized state where the amplitude of the vibration is reduced. A characteristic curve B in the graph shown in FIG. 4 represents a relationship between the number of revolutions "N" and the amplitude of the roller 105 at its point "a" in the rotating machine providing the vibration control device according to the second embodiment. As compared to the characteristic curve A corresponding to the conventional rotating machine which does not provide the vibration control device, the characteristic curve B indicates that the amplitude of the vibration is reduced to an extremely low level at the number of revolution which is in the proximity of the first-order natural frequency.

Next, modified examples of the second embodiment will be described respectively.

(1) The second embodiment described above provides one distance sensor with respect to each of the X-axis direction and Y-axis direction. However, it is possible to provide two distance sensors with respect to each of the axial directions. As for the Y-axis direction, one sensor detects the positional displacement of the secondary yoke in the (+Y)-axis direction, while another sensor detects the positional displacement of the secondary yoke in the (−Y)-axis direction. Thus, outputs of the two sensors can be obtained with respect to each axial direction. Those two outputs are subjected to differential amplification effected by a differential amplifier, the output of which is then used to control the vibration. In this modified example, the sensitivity can be doubled with respect to the detection for the positional displacement of the secondary yoke. In addition, it is possible to eliminate the noise signals, having the same phase, which are occurred in the sensors and amplifiers due to the variation of the temperature and the like. In short, the modified example can contribute to improvement of the precision for the measurement of the positional displacement of the secondary yoke.

(2) In the second embodiment, the constant-level electric current is supplied to each of the coils in response to the constant-current command; and in response to the variation of the positional displacement of the location of the secondary yoke 202 which is deviated from the ideal location, the amount of electric current supplied to one electromagnet is increased from the constant level of electric current set by the constant-current command, while the amount of electric current supplied to another electromagnet is decreased from the constant level of electric current. In short, the second embodiment controls the amount of electric current flowing through each of the coils on the basis of the constant level of electric current set by the constant-current command. However, the second embodiment can be modified so that the amount of electric current supplied to the electromagnet is directly controlled without using the constant-level electric current. For example, the second embodiment is modified such that when a certain positional displacement occurs in the secondary yoke 202, the location of the secondary yoke 202 is returned to its original location by supplying the electric current to one electromagnet only. More specifically, when the secondary yoke 202 is subjected to positional displacement in the (+Y)-axis direction so that the signal having the negative value is obtained from the controller 212Y, the electric current corresponding to that signal are supplied to the coils LYc and LYd only. On the other hand, when the secondary yoke 202 is subjected to positional displacement in the (−Y)-axis direction so that the signal having the positive value is obtained from the controller 212Y, the electric current corresponding to that signal are supplied to the coils LYa and LYb only. This modified example can be realized by re-designing the circuit shown in FIG. 15 such that the adder 221Y is replaced by a first limiter which passes a positive signal only, while the subtracter 222Y is replaced by a second limiter which passes a negative signal only. Both of the first and second limiters receive the same output signal of the controller 212Y, and they are located before the power amplifiers 231Y and 232Y respectively.

(3) In the second embodiment, the vibration control circuit 200 is equipped in the rotating machine. Instead, it is possible to locate the vibration control circuit outside the body of the rotating machine. In this case, the vibration control circuit is connected with the sensors and coils, provided within the body of the rotating machine, through cables.

(4) It is possible to further modify the second embodiment such that the spring force of the elastic member is provided to impart a preliminary pressure to the ball bearing through the secondary yoke in a direction directing the ball bearing to the center of axis of the shaft. This preliminary pressure can stabilize the characteristic of the ball bearing.

(5) FIG. 16 shows a further modified example of the second embodiment. This example is characterized by providing an elastic member 204 at each air-gap portion G (see FIG. 14) formed between the secondary yoke 202 and each magnetic pole of the primary yoke 201. Due to the provision of the elastic member 204, the secondary yoke 202 is elastically supported by the primary yoke 201. Even in this example, the same effects of the second embodiment can be obtained as well.

Lastly, this invention may be practiced or embodied in still other ways without departing from the spirit or essential character thereof as described heretofore. Therefore, the preferred embodiments described herein are illustrative and not restrictive, the scope of the invention being indicated by the appended claims and all variations which come within the meaning of the claims are intended to be embraced therein.

What is claimed is:

1. A vibration control device for a rotating machine comprising:

a primary yoke within a hollow space of a secondary yoke;

a shaft having one end fixedly mounted which supports said primary yoke by ball bearings, said secondary yoke rotating about said shaft;

a plurality of electromagnet portions arranged around a peripheral surface of said primary yoke, said plurality of electromagnet portions at least providing a pair of first and second electromagnet portions and another pair of third and fourth electromagnet portions, said first electromagnet portion being arranged opposite to said second electromagnet portion with respect to an X-axis direction crossing a sectional area of said primary yoke, said third electromagnet portion being arranged opposite to said fourth electromagnet portion with respect to a Y-axis direction which is perpendicular to the X-axis direction;

first detection means for detecting a positional displacement between said primary and secondary yokes with respect to the X-axis direction on the basis of a first reference value which is determined in advance;

second detection means for detecting a positional displacement between said primary and secondary yokes with respect to the Y-axis direction on the basis of a second reference value which is determined in advance;

first control means for controlling the positional displacement detected by said first detection means to be reduced by controlling electric current supplied to said first and second electromagnet portions; and second control means for controlling the positional displacement detected by said second detection means to be reduced by controlling electric current supplied to said third and fourth electromagnet portions.

2. A vibration control device for a rotating machine comprising:

a secondary yoke within a hollow space of a primary yoke;

a shaft having one end fixedly mounted which supports said secondary yoke by ball bearings so that said secondary yoke rotates together with said shaft within said primary yoke;

a plurality of electromagnet portions arranged around an interior wall of said primary yoke, said plurality of electromagnet portions at least providing a pair of first and second electromagnet portions and another pair of third and fourth electromagnet portions, said first electromagnet portion being arranged opposite to said second electromagnet portion with respect to an X-axis direction crossing a sectional area of said primary yoke, said third electromagnet portion being arranged opposite to said fourth electromagnet portion with respect to a Y-axis direction which is perpendicular to the X-axis direction;

first detection means for detecting a positional displacement between said primary and secondary yokes with respect to the X-axis direction on the basis of a first reference value which is determined in advance;

second detection means for detecting a positional displacement between said primary and secondary yokes with respect to the Y-axis direction on the basis of a second reference value which is determined in advance;

first control means for controlling the positional displacement detected by said first detection means to be reduced by controlling electric current supplied to said first and second electromagnet portions; and second control means for controlling the positional displacement detected by said second detection means to be reduced by controlling electric current supplied to said third and fourth electromagnet portions.

3. A vibration control device as in claim 1 wherein when the positional displacement occurs in the X-axis direction, said first control means controls amounts of electric current supplied to said first and second electromagnet portions respectively such that the positional displacement will be canceled, while when the positional displacement occurs in the Y-axis direction, said second control means controls amounts of electric current supplied to said third and fourth electromagnet portions respectively such that the positional displacement will be canceled.

4. A vibration control device for a rotating machine in which a rotating member rotates outside and around a shaft, having at least one end securely fixed, said vibration control device comprising:

a first pair of electromagnets disposed opposite to each other along a first axis crossing a sectional area of the rotating member;

a second pair of electromagnets disposed opposite to each other along a second axis crossing the sectional view of the rotating member;

first detecting means for detecting a first amount of displacement of the shaft in a direction of the first axis;

second detecting means for detecting a second amount of displacement of the shaft in a direction of the second axis; and control means for controlling an attraction force imparted to the rotating member by said first pair of electromagnets on the basis of the first amount of displacement detected by said first detecting means, said control means also controlling an attraction force imparted to the rotating member by said second pair of electromagnets on the basis of the second amount of displacement detected by said second detecting means.

5. A vibration control device as in claim 4 wherein said vibration control device is located in the rotating machine at a position which corresponds to a peak of an amplitude of a vibration occurring on the shaft.

6. A vibration control device as in claim 4 wherein a roller is attached to the shaft and is pressed against an external equipment, so that said control means controls the attraction force by use of a pressure applied between the roller and the external equipment in addition to the amount of displacement of the shaft detected by each of said first and second detecting means.

7. A vibration control device as in claim 4 wherein a first pair of sensors which are disposed opposite to each other along the first axis are provided as said first detecting means, while a second pair of sensors which are disposed opposite to each other along the second axis are provided as said second detecting means.

8. A vibration control device for a rotating machine in which a rotating member rotates about a shaft within a yoke, wherein at least one end of said shaft is securely fixed, said vibration control device comprising:

a pair of electromagnets which are attached to an interior wall of the yoke and are disposed opposite to each other along an axis crossing a sectional area of the rotating member;

a sensor for detecting a displacement of the shaft in a direction of the axis; and a control circuit for controlling an electromagnetic force produced by said pair of electromagnets so as to eventually control a vibration occurring on the shaft.

9. A vibration control device as in claim 8 wherein there are provided a pair of sensors which are disposed opposite to each other in the direction of the axis.

10. A vibration control device as in claim 8 wherein an electric current is only applied to one of said pair of electromagnets when controlling the vibration occurring on the shaft.

11. A vibration control device as in claim 8 wherein said control circuit is located outside the rotating machine, and cables connecting said control circuit with said sensor and said pair of electromagnets.

12. A vibration control device as in claim 8 further comprising an elastic member which is inserted in a gap between the rotating member and the yoke.

13. A vibration control device as in claim 2 wherein when the positional displacement occurs in the X-axis direction, said first control means controls amounts of electric current supplied to said first and second electromagnet portions respectively such that the positional displacement will be canceled, while when the positional displacement occurs in the Y-axis direction, said second control means controls amounts of electric current supplied to said third and fourth electromagnet portions respectively such that the positional displacement will be canceled.

* * * * *